United States Patent [19]

Nelson et al.

[11] 4,013,775
[45] Mar. 22, 1977

[54] PROCESS FOR PREPARING A SUGAR TABLET

[75] Inventors: Arthur L. Nelson, West Chester, Pa.; Donald J. Skrabacz, Cicero; Burbank Young, Lockport, both of Ill.

[73] Assignee: CPC International Inc., Englewood Cliffs, N.J.

[22] Filed: July 3, 1974

[21] Appl. No.: 485,480

Related U.S. Application Data

[63] Continuation-in-part of Ser. No. 254,552, May 18, 1972, abandoned, which is a continuation-in-part of Ser. No. 141,030, May 6, 1971, abandoned, which is a continuation-in-part of Ser. No. 767,520, Oct. 14, 1968, abandoned.

[52] U.S. Cl. .............................. 426/285; 426/660; 127/29; 127/63; 424/361
[51] Int. Cl.$^2$ ..................... A61J 3/10; A23G 3/00
[58] Field of Search ............ 195/31 R; 127/29, 30, 127/58, 61, 63; 426/147, 213, 285, 660; 424/361

[56] References Cited

UNITED STATES PATENTS

| 3,560,343 | 2/1971 | Armbruster et al. ............ 195/31 R |
| 3,622,677 | 11/1971 | Short .............................. 127/32 X |

FOREIGN PATENTS OR APPLICATIONS

| 740,236 | 4/1970 | Belgium |
| 1,286,275 | 8/1972 | United Kingdom |
| 1,063,535 | 3/1967 | United Kingdom |

*Primary Examiner*—Joseph M. Golian
*Attorney, Agent, or Firm*—Donald G. Marion

[57] ABSTRACT

Tabletting compositions are formed by adding to a crystalline sugar such as dextrose, sucrose, and blends of dextrose and sucrose, a low D.E. starch hydrolysate having a descriptive ratio of less than about 2 and subsequently agglomerating the mixture. When this starch hydrolysate is added in amounts of about 1 to about 10% by weight of the sugar, the resulting agglomerated crystals exhibit reduced dusting and breakage characteristics, as well as the ability to be easily compressed into strong tablets using relatively low pressures.

3 Claims, No Drawings

PROCESS FOR PREPARING A SUGAR TABLET

CROSS REFERENCE TO RELATED APPLICATIONS

This application is a continuation-in-part of application Ser. No. 254,552, filed May 18, 1972, now abandoned, which in turn is a continuation-in-part of application Ser. No. 141,030, filed May 6, 1971, now abandoned, which in turn is a continuation-in-part of application Ser. No. 767,520, filed Oct. 14, 1968, now abandoned.

BACKGROUND OF THE INVENTION

1. Field of the Invention

This invention relates to direct compression tabletting compositions and the pharmaceutical tablets produced therefrom. More particularly, this invention relates to improved direct compression tabletting compositions prepared from a uniquely agglomerated mixture of a crystalline sugar such as dextrose monohydrate, sucrose, or blends of sucrose and dextrose and a maltodextrin having a measurable dextrose equivalent value not substantially above about 25 and a descriptive ratio of at least about 2. The improved direct compression tabletting compositions are capable of being directly compressed into commercially acceptable and hard tablets. The new direct compression tablets can be used as the sole binder disintegrant without the aid of other adjuvants ordinarily used for this purpose.

2. Description of the Prior Art

The compressed tablet is the most popular unit dosage form for medicinal substances. The tablet as a dosage form can be traced to well over 1,000 years ago when a procedure for molding solid forms containing medicinal ingredients was recorded. As a result of the introduction of new carriers and compression vehicles, tablets are replacing all forms of pills, powders and capsules. Accordingly, tablets presently represent the largest production volume of all pharmaceuticals.

The reason for the widespread use of tablets is apparent, since tablets enable: (1) administration of medication in an accurate dose, (2) fast and accurate dispensing with less chance of error and contamination, (3) ease of administration, (4) administration in a form in which the time and area of contact between the active ingredient and the taste buds is reduced, thus obviating the physiological problems associated with the oral administration of drugs that possess a bitter taste and, in the case of coated tablets, with drugs that possess a disagreeable odor, (5) release of drugs of specific locations in the gastro-intestinal tract to: (a) prevent degradation of drugs sensitive to the low pH environment in the stomach, (b) prevent release of drugs that irritate the gastric mucosa in the stomach, (c) facilitate local action or preferential absorption at specific sites in the tract, (6) enhance stability by effecting a marked reduction in the surface of the drug exposed to the environment, (7) rapid production, and (8) economy and ease in storage, packaging and shipping.

It is well-known that in order to form a tablet of a given material, the material must possess fluidity and compressibility. It is essential that the material must flow uniformly from the hopper to the dies of the tablet press. Any defective flow of the material will affect the weight of the tablets, content uniformity, disintegration time, hardness, friability, and also the bioavailability of the active ingredient.

There are currently three basic methods for tabletting. They are the wet granulation method, the dry granulation method, and the direct compression method. The direct compression method is by far the desired method from the standpoint of processing procedures, equipment and materials. However, only a very limited number of pharmaceutically used substances possess enough cohesive strength and flowability to allow direct compression without previous granulation. Certain crystalline materials, such as potassium bromide and potassium chloride can be compressed without preliminary treatment. Also, aspirin, phenolthaline, and chlorohydrate can be directly compressed.

It has been stated that the ideal material to compress would be composed of crystals which, at the moment of compression, behaved like clay rather than rubber. The crystals should be such that on release of pressure they should not rebound into their original shape. Generally, most materials possess both plastic and elastic deformation properties. Therefore, most materials are not suitable for direct compression without previous granulation.

It has been estimated that about 20% of the materials used for tabletting in the pharmaceutical field may be compressed directly. In order to use this method to a considerable extent, many more materials should be modified by treatment or by use of additives. Modification may be undertaken either by treating the material in some special way during earlier stages of preparation, or by adding a binder or excipient material which will surround the active ingredient and form an easily compressible carrier.

An ideal direct compression vehicle should possess the following properties: (1) low elastic modulus, (2) high dislocation density, (3) inert, non-potent and non-toxic, (4) high degree of plastic deformation, (5) colorless, odorless, tasteless or without disagreeable taste, (6) free-flowing, (7) compatible with active ingredients and common additives like lubricants, colors, etc., (8) fast disintegration properties, or should not delay the bioavailability of the drug, (10) limited range of particle size distribution, (11) stable against effects of aging, and (12) reworkable and should possess high carrying capacity for active medicinal agents.

There are currently several available direct compression vehicles. They include spray-dried lactose; anhydrous lactose; microcrystalline cellulose; dicalcium phosphate dihydrate, unmilled; Cellutab; spray-congealed mannitol; Emcompress; Magnapol; Frodex; and Di Pac.

Microcrystalline cellulose is a natural cellulose in specially processed form which makes it digestible. It normally produced good tablets with fast disintegration and drug release properties. It has been found to give better results if stored in a dry condition before use — exposure to a slightly humid atmosphere makes it compress less easily. It is quite fluffy by nature.

Spray-dried lactose has a heavy appearance when poured and is spherical in shape. It cannot be reworked, as the spherical shape is lost when ground. It has been disclosed that spray-dried lactose with 5–10% maize starch as a disintegrant and 0.5% magnesium stearate as a lubricant forms a useful direct compression base. However, it has the tendency to get brown in the presence of moisture, amines, phosphates, lactates and acetates. Borates and the stearate lubricants tend to retard the browning.

Dicalcium phosphate dihydrate has good flow and compressibility properties. The tablets from dicalcium phosphate dihydrate are also easily embossed. The increased flow is believed to be due to its high density. It cannot be reworked. Due to its alkaline pH, stability of ingredients like Vitamin C or aspirin may be affected.

The vehicle mannitol, absorbs heat from the surroundings when going into solution, and results in good "mouth feel". Thus, it is commonly used in chewable tablets. It has been reported that a change in the compression characteristics of mannitol occurs when spray-congealing the product.

The vehicle known in the art as Cellutab is a spray-dried dextrose product. It has excellent flow characteristics. It is relatively coarse compared to other vehicles and contains approximately 8% moisture.

The product known in the art as Emcompress is essentially a blend of dicalcium phosphate dehydrate, unmilled; starch; Avacil; and magnesium stearate. It is free-flowing, self-lubricating and possesses good compression characteristics.

The vehicle known in the art as Di Pac is a mixture of a crystalline sugar and a maltodextrin. The preparation of this product is generally described in U.S. Pat. No. 3,642,535, granted Feb. 15, 1972.

Although the direct compression method for preparing tablets is by far the method of choice by virtue of its simplicity, this method has several limitations which have hampered its use in the tabletting industry. These limitations include: (1) differences in the particle size, and bulk density between the diluent and the active ingredient may lead to stratification and variation in drug content of tablets, (2) unless the drug itself is easily compressible, the amount present is limited to a maximum of 25% of the tablet weight (of course, the amount of vehicle and the weight of the tablet may be increased to reduce the percentage of active ingredient. Then there arises a question of economics and size of the tablet, a question that may be resolved only by wet granulation.), (3) the drug may interact with the vehicle, such as amine compounds do with spray-dried lactose, and (4) static charges which may develop on the drug during combination and mixing may prevent uniform distribution.

In light of the limitations mentioned hereinabove, the great percentage of tabletting operations, therefore, have been forced to resort to other formulation techniques such as the wet and dry granulation methods. Thus, there is a continued search for an improved direct compression tabletting composition capable of being employed as a binder in the preparation of tablets by direct compression which are rapidly disintegrative, resistant to breakage and crumbling and compatible with the active material incorporated therein which forms the basis of the composition's utility.

A more detailed description of the tabletting art is discussed, for example, in "Remington's Pharmaceutical Sciences" Mack Publishing Co. (1965) chapter 39, as well as in U.S. Pat. Nos. 3,305,447 and 3,622,677.

Crystalline sugars used in the food and pharmaceutical industries are generally of two major types. The first type is sucrose derived from sugar cane or sugar beets. The second type is dextrose generally produced by the hydrolysis of starch to the monosaccharide. The art has developed many methods, now considered conventional, for crystallizing raw sugars. One of the most common of these methods comprises first providing an uncrystallized raw sugar in solution form, next concentrating the solution to supersaturation, and then seeding the super-saturated solution with already formed sugar crystals. By subsequent cooling of the solution, new crystals form and grow. After formation of the crystals, the remaining mother liquor is seperated from the crystals. The crystals are then washed and dried to yield the final crystalline sugar product.

The prior art further discloses the use of corn syrup solids having a dextrose equivalent of from 15 to 60, as described in British Patent No. 1,063,535, issued to Huste et al., as an agglomerating agent. However, the corn syrup solids described in Huste et al, by virtue of the method of their preparation, have a descriptive ratio less than 2; and, accordingly, tend to by hygroscopic. The descriptive ratio is herein defined as a starch hydrolysate having the sum of the percentages (dry basis) of saccharides therein with a degree of polymerization of 1 to 6 divided by the D.E.

U.S. Pat. No. 3,560,343 to Armbruster et al., discloses a method for preparing low D.E. starch hydrolysates by first treating an aqueous slurry of starch with an acid at elevated temperatures followed by enzymatic saccharification with bacterial alpha-amylase. The products of this unique process are characterized as having a descriptive ratio of at least about 2. The products are disclosed as being useful for many purposes including agglomeration and tabletting, although the specific mode of use thereof is not disclosed in the patent.

Commercial acceptability of an agglomerated sugar is heavily dependent upon its degree of resistance to caking, flowability, agglomerate strength and low dusting characteristics as well as its ability, when used in edible tablet form, to form a strong, easily compressible, tablet of a desired density. Generally speaking, it is believed that for any given agglomerated sugar, agglomerate particle size plays an important role in achieving acceptable levels of these desired characteristics. For example, for many agglomerated sugars, as particle (agglomerate) diameter decreases, losses relating to tablet breakage, dusting, etc. increase exponentially and production decreases. Further, and for the same and other agglomerated sugars, as the particle (agglomerate) diameter decreases, the weight and volume of a tablet increases, thus resulting in a loss of compressibility at constant volume of fill. The problem of dusting, breakage, and compressibility therefore may generally be minimized for any given system using a particular agglomerating agent when forming edible tablets thereof, if the agglomerated particles therein are relatively large, usually above about 200 microns and preferably above about 400 microns. In practice, if an agglomerated sugar product using any particular agglomerating agent has a conventional screen profile wherein a substantial portion of the agglomerated sugar particles are caught by the screens having a mesh size of about 65 or more (i.e., having mesh numbers lower than 65), the agglomerated sugar exhibits characteristics which are particularly desirable for tablets.

When using heretofore conventional agglomerating agents, acceptable levels of screen profiles, agglomerate characteristics, and edible tablet characteristics have been achieved only with difficulty and by using large amounts of agglomerating agents and water. In certain instances, such as when sucrose or blends of sucrose and dextrose were sought to be agglomerated, agglomeration has either failed entirely or the agglomerates were only, in rare instances, of an acceptable quality and were also generally non-reproducible. In many instances when dextrose was agglomerated, the agglomerated product formed was only of low standards. Such results obviously present a very real problem to the industry as a whole.

SUMMARY OF THE INVENTION

This invention relates to agglomerated sugars and methods of making them. More particularly, this invention relates to the use of low D.E. starch hydrolysates as agglomerating agents for crystalline sugars.

Crystalline sugars used in the food and pharmacentical industries are generally of two major types, the first type is sucrose derived from sugar cane or sugar beets. The second type is dextrose generally produced by the hydrolysis of starch to the monosaccharide.

It is an object of this invention to provide the art with new agglomerable compositions of crystalline sugars which include dextrose, sucrose and/or blends or dextrose and sucrose, containing an agglomerating agent, and with agglomerated sugars an edible tablets made therefrom, all of which are of acceptable, and in most instances, of improved quality which compositions eliminate or substantially reduce the above problems in the art.

It is another object of the present invention to provide a novel crystalline sugar product in agglomerated form.

It is another object of the present invention to provide a sugar product in agglomerated form which is easily tabletted and which crystals are exceptionally strong.

Yet another object of the invention is to provide a new binder suitable for use in the preparation of agglomerated crystalline sugars.

A still further object of the invention is to provide crystalline sugar agglomerates which are free-flowing.

Other objects of the present invention will be apparent hereinafter from the following description and from the recitals of the appended claims.

The above objects are basically fulfilled in accordance with this invention by replacing conventional agglomerating agents, heretofore used, with an agglomerating agent that may be generally characterized as a low D.E. starch hydrolysate having a descriptive ratio of at least 2. By using this hydrolysate, novel compositions of agglomerated sugars, and edible tablets may be formed.

DETAILED DESCRIPTION OF THE INVENTION

The agglomerable sugar compositions as contemplated by this invention broadly comprise: a crystalline sugar, and an agglomerating agent comprised of a low D.E. starch hydrolysate having a descriptive ratio of at least 2, which combination in the presence of sufficient water with subsequent drying forms an agglomerate. Due to the presence of the low D.E. starch hydrolysate having a descriptive ratio of at least 2, the crystalline sugar easily agglomerates when using the instantly disclosed agglomerating techniques to provide a crystalline sugar agglomerate of strong particles which exhibit excellent screen profiles and flowability and which, upon storage and shipping, show less breakage and less dusting than conventional sugar agglomerates.

Crystalline sugars useful in this invention include any type of crystalline sugar product, examples of which include dextrose, sucrose, lactose and the like and blends thereof. Many of these crystalline sugars are well known in the art and are conventional articles of commerce sold under various tradenames, etc. Such sugars are generally produced and crystallized by conventional techniques as hereinbefore described.

The crystalline sugars useful in this invention may be admixed in either dry or wet form with the agglomerating agent. Preferably, the crystalline sugar used is one which is still in its centrifuge cake form following crystallization, which cake has been washed and centrifuged to a water content, excluding water of hydration which, if present, comprises about 1–16% of the cake weight. For most situations, the water present in this cake will be sufficient to provide the necessary amount of water to agglomerate the sugar. In this respect, the amount of water necessary to agglomerate the above-described composition of this invention, excluding water of hydration, is preferably from about 1 to about 8% by weight of the total composition.

As stated hereinabove, the agglomerating agents used in this invention may generally be described as low D.E. starch hydrolysates having a descriptive ratio of at least 2. These low D.E. starch hydrolysates are used in any amount, but preferably in an amount of about 1 to about 10% by weight of the sugar solids and more preferably from about 2 to about 4% by weight thereof. Of course, the amount of agglomerating agent used may vary, depending on the crystalline sugar employed and end use of the agglomerated sugar. For example, agglomerated tabletting dextrose having the cool taste sensation characteristic of dextrose is accomplished by using a small amount of low D.E. starch hydrolysate, i.e., from about 2 to about 4% by weight of dextrose.

The low D.E. starch hydrolysates used in this invention for making crystalline sugar agglomerates are a relatively new class of starch materials. The starch hydrolysates are made by subjecting a source of starch to enzyme or acid treatment or a combination of both. It is important that the starch hydrolysate have a relatively low D.E. (dextrose equivalent) of less than about 25 and, most preferably, have a D.E. in the range from 5 to 25. The most preferred materials have a D.E. within the range of 10 to 15, although starch hydrolysates having a D.E. within the range of 5 to 13 which have a descriptive ratio of at least 2 have been found suitable. Starch hydrolysates of this type have been found to be excellent agents useful in reducing moisture pick-up normally hygroscopic edible foods, whereas use of other hydrolysates having a D.E. substantially outside this range results in inferior products which still show a tendency to entrap moisture, thus tending to cake or become sticky.

The term "D.E." is used herein to refer to the reducing sugar content of the dissolved solids in a starch hydrolysate expressed as percent dextrose as measured by the Luff-Schoorl method (NBS Circular C-40, page 195, as appearing in "Polarimetry, Saccharimetry, and the Sugars", authors Frederick J. Bates and Associates).

The initial starch which is subjected to hydrolytic treatment may be derived from a wide variety of starch materials such as cereal starches, waxy starches, and/or root starches. Typical of these groups are corn starch, potato starch, tapioca starch, grain sorghum starch, waxy milo starch, waxy maize starch rice starch and the like. The term "starch hydrolysate", as used herein encompasses hydrolyzed starchy materials derived from a wide variety of starch sources known in the industry.

As hereinbefore stated, the starch hydrolysates preferred for use in the present invention are those having a D.E. ranging from about 5 to 25 and which are made by any number of specific methods.

In one method referred to in Example 1 as Method A, a starch such as a waxy starch is treated with single enzyme application of bacterial alpha-amylase. More specifically, an aqueous slurry of a waxy starch, having a solids content less than 50%, is subjected to the hydrolytic action of bacterial alpha-amylase under suitable conditions of fermentation to produce a starch hydrolysate. The hydrolysate is further characterized as having the sum of the percentages (dry basis) of saccharides therein with a degree of polymerization of 1 to 6 divided by the D.E. to provide a ratio greater than about 2.0. This ratio is referred to as the characteristic or descriptive ratio. Those low D.E. products having a descriptive ratio less than about 2 are somewhat undesirable in that, for example, they exhibit less water solubility, tend to form haze in solution, and also tend to be hygroscopic as compared to those products with a descriptive ratio of at least 2.

The same product as described above, may also be made via a number of other routes. For example, a mixture of starch and water having a solids content less than 50% may be first subjected to the hydrolytic action of a bacterial alpha-amylase followed by a high temperature heating step to solubilize any unsolubilized starch. Since this temperature tends to inactivate the enzyme, it is then necessary to cool the solubilized partial hydrolysate and subject it to a second hydrolysis by treatment with additional bacterial alpha-amylase to obtain the final starch hydrolysate. This method is referred to as Method B in Example 1.

A third method of making the preferred class of low D.E. starch hydrolysates referred to as Method C in Example 1, consists of hydrolyzing a mixture of starch and water by the action of acid to reach a D.E. between about 5 and about 15. The partial hydrolysate is subsequently subjected to the action of bacterial alpha-amylase to obtain a starch hydrolysate having a D.E. of from about 10 to about 25.

A particularly preferred starch hydrolysate useful in the present invention has the following specifications: moisture content about 5% maximum, and D.E. 10–13.

As alluded to hereinabove, the agglomerable compositions are preferably formed by adding to wet crystalline sugar, a dry low D.E. starch hydrolysate agglomerating agent. Although this procedure is preferred, other methods of formulation may also be used. For example, the low D.E. starch hydrolysate agglomerating agent may first be placed in a solution containing up to about 60% solids with sufficient water to provide from 1–16% by weight water in the final agglomerated composition. This solution may then be added to dry crystalline sugar by blending or by spraying. As another example, the agglomerable compositions of this invention may be formed in situ by admixing water, dry crystalline sugar, and dry agglomerating agent with as little moisture as 2%.

The agglomerable compositions of this invention, regardless of the procedure used to formulate them, are easily agglomerated using conventional techniques. The agglomerated products so formed have excellent screen profiles, exhibit good anti-caking and flowability characteristics, and contain strong agglomerate particles which resist dusting and breakage. The agglomerated products, furthermore, exhibit excellent bulk density and compressibility characteristics and, therefore, may be readily formed into strong, edible tablets using conventional techniques.

In one typical example of the above-described manner of making and using the invention, an agglomeratable composition is formed by throughly admixing 97 parts by weight of wet dextrose crystals and 3 parts by weight of 10 D.E. starch hydrolysate, the water content of the mixture being about 2–4% by weight, excluding water of hydration. The mixture is then put through an agglomerator, such as a Colton Granulator, and dried. The crystal agglomerates emerge from the dryer at conventional moisture levels. The agglomerates are found to be of hard crystalline nature. When subjected to pressure such as in a conventional tabletting machine, the agglomerates require only about one-half the conventional pressure generally necessary to form a strong tablet.

Another conventional technique of making and using the invention includes the use of the Turbulizer beater-crystallizer such as disclosed in U.S. Pat. No. 3,365,331, issued Jan. 23, 1968, the disclosure of which is incorporated herein by reference. The Turbulizer beater-crystallizer simply effects a rapid crystallization of the crystalline sugar, i.e., sucrose, from the concentrated sugar syrup and the low D.E. starch hydrolysate which is also introduced into the beater-crystallizer to accomplish co-crystallization. Within such a crystallizer, a gas, such as air, is forced through the crystallization zone to prevent an increase in the temperature of the syrup and the crystallized agglomerate product resulting therefrom and to carry off water vapor produced within the crystallization zone due to the crystallization of the sugar from the syrup.

In this respect, manufactured items, as contemplated by this invention, include all forms and shapes of compressed or extruded agglomerated sugars. The basic composition of these items comprises an agglomerated sugar and a low D.E. starch hydrolysate. In the case of placeboes, no further additives would generally be present in the tablet or pill. In the case of candy mints, breath mints, candy cigarettes, etc., conventional flavorings such as citric acid, retsyn, chlorphyll, etc. may be added. In the case of medicinal pills or pharmaceutical tablets, the pharmaceutically active ingredient such as a medicine, vaccine, anti-biotic, etc., will be added in conventional dosages.

The agglomerable compositions and agglomerates of this invention find many used in the food and pharmaceutical industries. Aside from their utility in the edible tablet art, as hereinabove described, they find wide utility in other arts such as in those arts wherein quick dispersibility in water, coarse uniform particle size, freedom from breakage and dusting, and the like is desired.

The following specific examples further illustrate the invention. As such, they are not limitations thereon. All percentages are by weight and temperatures are in degrees Fahrenheit unless otherwise stated.

EXAMPLE 1

The following specific procedures illustrates the above-described three basic methods for making the low D.E. starch hydrolysate agglomerating agents used in this invention.

Method A — One Step Enzyme Technique

An aqueous starch slurry was prepared containing 30% solids by weight of waxy milo starch. The temperature of the slurry was raised and held between 85° and 92° C. A bacterial alpha-amylase preparation was added in an amount just above 0.025% by weight of the starch over a period of slightly more than 30 minutes. The mixture was then held at the same temperature for an additional period of 30 minutes. The temperature was then reduced to below 80° C and the conversion was allowed to continue until the desired D.E. was reached. The temperature of the mixture was then suddenly raised to about 120° C in order to inactivate the enzyme and terminate the conversion.

Table 1 below sets forth typical saccharide analyses of low D.E. hydrolysates obtained in accordance with the above procedure. DP designates the degree of polymerization. $DP_1$ represents the total quantity expressed in percent by weight, dry basis, of monosaccharides present in the hydrolysate. $DP_2$ represents the total quantity of disaccharides present in the hydrolysate, and so forth.

TABLE 1

| Hydrolysate Composition | Typical Saccharide Analyses D.E. | | | | |
|---|---|---|---|---|---|
| | 5 | 10 | 15 | 20 | 25 |
| $DP_1$ | 0.1 | 0.3 | 0.7 | 1.4 | 2.4 |
| $DP_2$ | 1.3 | 3.4 | 5.5 | 7.6 | 9.7 |
| $DP_3$ | 1.8 | 4.3 | 6.9 | 9.4 | 12.0 |
| $DP_4$ | 1.8 | 3.5 | 5.2 | 6.9 | 8.6 |
| $DP_5$ | 1.8 | 3.6 | 5.5 | 7.4 | 9.3 |
| $DP_6$ | 3.3 | 7.0 | 10.6 | 14.3 | 18.0 |
| $DP_7$ and higher | 89.9 | 77.9 | 65.6 | 53.0 | 40.0 |
| Total DP | 10.1 | 22.1 | 34.4 | 47.0 | 60.0 |
| Descriptive Ratio | 2.0 | 2.2 | 2.3 | 2.4 | 2.4 | alpha-amylase (produced and marketed by Miles completion of starch addition, liquefaction was continued for 60 minutes, after which time the hydrolysate was within the D.E. range of 2 to 5. The liquefied starch was then heated to 150° C and held at this temperature for 8 minutes. The heat treatment destroyed residual enzyme activity and resulted in improved filtration rates and in decreased yield losses upon filtration.

Further saccharification to the final D.E. was accomplished by the addition of more HT-1000 bacterial alpha-amylase after cooling the liquefied starch hydrolysate to a suitable temperature for conversion. The liquefied starch was cooled to 80°–85° C and HT-1000 added in an amount of 0.02% by weight starch solids. After 14 to 20 hours of conversion, the desired terminal D.E. of 20 was obtained.

The final starch hydrolysate product was analyzed and the following analytical values were obtained.

TABLE 2

| D.E. | $DP_1$ | $DP_2$ | $DP_3$ | $DP_4$ | $DP_5$ | $DP_6$ | $DP_{7+}$ | Descriptive Ratio |
|---|---|---|---|---|---|---|---|---|
| 20.7 | 2.4 | 7.5 | 10.8 | 8.0 | 6.8 | 15.1 | 49.4 | 2.4 |

Method C — Two Step Acid-Anzyme Technique

Several samples of corn starch (A, B and C) were slurried in water providing slurries having Baumes ranging from 14° to 22°. These slurries were partially acid hydrolyzed to a maximum of 15 D.E. The particular D.E. achieved by acid hydrolysis in each of the samples is set forth in Table 3 below. After acid hydrolysis, the slurry was neutralized to a pH between 6 and 7. The netrualized liquor was cooled to between 80° and 85° C, and dosed with bacterial alpha-amylase (HT-1000) in the quantity set forth below. A final D.E. of 19 to 21 was obtained in each of the samples in a period of time between 1 and 3 hours. The final conversion liquors are low in color. These liquors are easily refined and evaporated to about 42 Baume to provide syrups. Dry products may also be obtained. Tables 3 and 4 below set forth the reaction conditions for conversion and the product analyses, respectively.

TABLE 3

| Sample | D.E. of Acid Hydrolysate | Enzyme Conversion Conditions | | | | | Final D.E. |
|---|---|---|---|---|---|---|---|
| | | & Dry Substance | Temp C | ph | Enzyme Dose | Time Hours | |
| A | 15.2 | 38.0 | 80 | 6.5 | 0.01 | 1 | 19.7 |
| B | 12.9 | 37.5 | 85 | 6.5 | 0.05 | 2 | 20.2 |
| C | 10.3 | 38.1 | 85 | 6.5 | 0.10 | 2 | 21.8 |

TABLE 4

| Sample | Final D.E. | % Dry Substance | Product Analyses | | | | | | | Descriptive Ratio |
|---|---|---|---|---|---|---|---|---|---|---|
| | | | $DP_1$ | $DP_2$ | $DP_3$ | $DP_4$ | $DP_5$ | $DP_6$ | $DP_{7+}$ | |
| A | 19.7 | 72 | 3.9 | 5.8 | 8.2 | 7.2 | 7.3 | 10.2 | 57.4 | 2.1 |
| B | 20.2 | 72 | 2.3 | 5.9 | 8.5 | 6.4 | 6.6 | 12.6 | 57.7 | 2.1 |
| B | 21.8 | 75 | 2.3 | 8.3 | 10.9 | 8.1 | 9.2 | 16.9 | 44.3 | 2.5 |

Method B — Two Step Enzyme-Enzyme Technique

Unmodified corn starch was slurried in water to provide an aqueous suspension containing 28–32% by weight of the unmodified corn starch. The pH was at 7.5–8.0. To this mixture was added HT-1000 bacterial

EXAMPLE 2

Preparation Of Crystalline Dextrose Agglomerates

A starch hydrolysate having a D.E. of approximately 10 was formed according to the procedure of Example 1, Method A. The analysis of this product was substantially the same as the analysis of the 10 D.E. product in Table 1. Two batches of centrifuge cake sugar of crystalline dextrose, each weighing 50 pounds were admixed with the hydrolysate, the hydrolysate being added in the amount of 2 and 4% by weight of solids, respectively, and being either dry or wetted with a small amount of water as indicated in Table 5. The original centrifuge cakes prior to hydrolysate addition, had approximately 12–15% moisture therein, including about 9% water of hydration. After blending the dextrose with the low D.E. hydrolysate for about 10 minutes in a Day Brand twin shell sigma blade mixer, the resulting mixture was then fed into a stream jacketed hot air rotary drier having a temperature of 270° F. After 15 minutes drying time, the dry product was screened with a Tyler No. 10 sieve and the percent through was considered the yield (i.e., product). The agglomerated products exhibited a screen profile as shown in Table 5.

For comparative purposes, the same basic procedure was followed as just described, except that instead of using the low D.E. hydrolysate, usual and comparable amounts of the conventional agglomerating agents, i.e., liquid dextrose and corn syrup (60% solids), were used. Three different types of conventional corn syrup were used. In addition, one run was made omitting an agglomerating agent entirely. This run is considered as a control and is listed as batch 1. Another run was made adding only 2% $H_2O$ to the cake without the addition of any agglomerating agent (batch 16). Table 5, for comparative purposes, includes the screen profiles and other characteristics of these conventional agglomerates. For simplicity, the hydrolysate is referred to in this table as HY, and the liquid dextrose is referred to as LD.

TABLE 5

| Batch | Additives | Amount | Moisture | A.I.(a) | % Oversize | Screen Profile % Through | | | | | | |
|---|---|---|---|---|---|---|---|---|---|---|---|---|
| | | | | | | 14(b) | 20 | 35 | 42 | 60 | 80 | 100 |
| 1 | None | | 8.9 | 82.4 | 4.0 | 99.6 | 98.8 | 90.4 | 86.6 | 73.8 | 38.4 | 18.0 |
| 2 | Corn Syrup A | 2% | 8.1 | 68.8 | 5.0 | 99.6 | 98.2 | 86.8 | 77.4 | 39.2 | 16.6 | 1.2 |
| 3 | Corn Syrup A | 4% | 7.6 | 46.8 | 10.0 | 97.2 | 91.4 | 62.4 | 47.8 | 12.6 | 0.8 | 0.4 |
| 4 | Corn Syrup A | 6% | 9.4 | 11.4 | 24.5 | 71.6 | 38.2 | 3.0 | 1.4 | 0.4 | 0.0 | 0.0 |
| 5 | Corn Syrup B | 2% | 8.4 | 39.4 | 4.5 | 99.0 | 96.8 | 74.4 | 62.6 | 25.8 | 3.6 | 0.8 |
| 6 | Corn Syrup B | 4% | 8.8 | 38.0 | 13.0 | 96.6 | 86.4 | 49.2 | 33.4 | 11.4 | 2.4 | 1.0 |
| 7 | Corn Syrup B | 6% | 8.5 | 28.0 | 40.0 | 91.0 | 60.0 | 20.0 | 11.8 | 4.0 | 1.2 | 0.4 |
| 8 | Corn Syrup B | 8% | 5.9 | 37.2 | 69.0 | 82.2 | 60.4 | 26.4 | 18.6 | 6.4 | 1.4 | 0.8 |
| 9 | HY | 2% Dry | 8.6 | 46.2 | 7.5 | 98.8 | 95.6 | 71.4 | 60.4 | 32.8 | 7.8 | 2.6 |
| 10 | HY | 4% Dry | 7.1 | 60.8 | 13.0 | 97.4 | 86.6 | 71.8 | 59.0 | 26.0 | 5.0 | 2.0 |
| 11 | HY | 2% Wet | 8.3 | 44.0 | 8.5 | 99.0 | 95.2 | 66.2 | 57.0 | 30.6 | 8.2 | 3.2 |
| 12 | HY | 4% Wet | 7.4 | 49.4 | 15.5 | 96.8 | 93.6 | 54.2 | 42.2 | 20.2 | 5.6 | 2.4 |
| 13 | Corn Syrup C | 2% | 6.4 | 68.6 | 5.0 | 98.8 | 95.2 | 67.4 | 53.0 | 20.0 | 2.4 | 0.8 |
| 14 | Corn Syrup C | 4% | 6.7 | 62.2 | 9.0 | 96.4 | 87.4 | 56.4 | 43.8 | 16.4 | 0.8 | 0.0 |
| 15 | Corn Syrup C | 6% | 6.6 | 48.8 | 7.0 | 95.0 | 96.0 | 60.8 | 43.8 | 8.8 | 0.4 | 0.2 |
| 16 | $H_2O$ | 2% | 8.6 | 52.2 | 52.0 | 88.4 | 74.8 | 53.6 | 48.4 | 38.0 | 26.0 | 19.8 |
| 17 | LD | 10% | 8.4 | 56.2 | 56.0 | 86.6 | 69.4 | 41.8 | 35.4 | 24.6 | 15.2 | 11.2 |

(a)Attrition index = a standard indication and measurement of hardness.
(b)The numbers 14,20,35,42,60,80 and 100 indicate the standard mesh size or number of screens used to obtain a profile, i.e., Tyler Standard Screen Scale Sieves.

Regardless of the type of agglomerating agent added in this example, the resulting product was a coarser sugar than if no agglomerating agent was added or if only water was added to the cake prior to agglomeration. All of the corn syrup products exhibited high tendencies toward caking, while the products of this invention, which use hydrolysate as the agglomerating agent, exhibited acceptable to excellent anti-caking tendencies. In addition, all 6 and 8 percent corn syrup additions resulted in too great a yield loss to be acceptable while 2 and 4 percent levels were tolerable. All screen profiles, except for those of the control and water addition runs, were within acceptable limits, the profile of liquid dextrose (batch 17) being least acceptable of all and is almost unacceptable.

The above agglomerates of batches 1–7 were next pressed into tablets using a conventional tablet machine and pressures as indicated in Table 6. The following data resulted.

TABLE 6

| | Characteristics Of Agglomerates | | | Tablets | | |
|---|---|---|---|---|---|---|
| Batch | Caking Tendency | Unacceptable | Reason For Unacceptability | Average Thickness | Average Weight | PSI/in |
| 1 | Normal | — | — | .370 | 2.0738 | 7.92 |
| 2 | High | X | Caking | .356 | 1.8400 | 11.77 |
| 3 | High | X | Caking | .364 | 1.9490 | 22.58 |
| 4 | High | X | Yield | .365 | 2.1555 | 10.27 |
| 5 | High | X | Caking | .378 | 2.1086 | 23.70 |
| 6 | High | X | Caking | .380 | 2.1792 | 25.42 |
| 7 | High | X | Yield | .357 | 2.1456 | 43.42 |
| 8 | High | X | Yield | .349 | 2.0645 | 30.00 |
| 9 | Normal | — | — | .399 | 2.2021 | 11.64 |
| 10 | Normal | — | — | .387 | 2.1261 | 15.58 |
| 11 | Slightly Higher | — | — | .389 | 2.1993 | 20.05 |
| 12 | Slightly Higher | — | — | .386 | 2.1224 | 16.27 |
| 13 | High | X | Caking | .360 | 2.0106 | 22.97 |
| 14 | High | X | Caking | .361 | 2.0567 | 24.13 |
| 15 | High | X | Caking | .348 | 1.9867 | 38.62 |
| 16 | Normal | X | Yield | .396 | 2.2842 | 15.15 |

TABLE 6-continued

| Batch | Characteristics Of Agglomerates | | | Tablets | | |
|---|---|---|---|---|---|---|
| | Caking Tendency | Unacceptable | Reason For Unacceptability | Average Thickness | Average Weight | PSI/in |
| 17 | Normal | X | Yield | .394 | 2.3184 | 17.10 |

(a)Batches 9–12 are the hydrolysate agglomerate tablets, all others are conventional tablets. The batches are numbered in this table correspond to those of Table 5.

The data in Table 6 show that all agglomerates of the corn syrup type and liquid dextrose type were unacceptable either because of their high tendency to cake or their low yield. The data in Table 6 also show that only those agglomerates which used the low D.E. starch hydrolysates having a descriptive ratio of at least 2 as an agglomerating agent formed acceptable tablets with breakage strength higher than the control.

EXAMPLE 3

The comparative purposes, three test agglomerates and tablets were made from a dextrose filter cake. The first two tests used in compositions of this invention, the third test used a conventional corn syrup as the agglomerating agent. Agglomeration was conducted in a Hobart stream jacketed mixer. The conditions of formulation were as follows:

TABLE 7

| Run No. | Agglom. Agent | Amount Of Temp. Of Agglom | Agglom. Agent (% by Wt. sugar basis) | Tendency to Cake |
|---|---|---|---|---|
| 1 | Hy (a) | 40° C | 3% | None |
| 2 | Hy (a) | 40° C | 3% | None |
| 3 | Corn Syrup solids | | | High - plastic in nature |

(a) Hy = hydrolysate formed according to a procedure in Example 1, Method A, and conforming substantially to the analysis of the 10 D.E. product in Table 1.

The screen profiles of these tests were as follows:

TABLE 8

| Run No. Screen (mesh) Analysis % Through | 1 | 2 | 3 |
|---|---|---|---|
| 20 | 89.8 | 94.4 | 98.0 |
| 28 | 77.6 | 87.0 | 92.0 |
| 35 | 63.4 | 75.8 | 81.8 |
| 42 | 53.4 | 66.6 | 73.6 |
| 48 | 43.4 | 54.8 | 64.2 |
| 60 | 32.2 | 40.4 | 53.4 |
| 65 | 22.4 | 27.0 | 41.2 |
| 80 | 14.2 | 15.6 | 29.2 |
| 100 | 8.4 | 7.6 | 16.4 |
| 150 | 3.2 | 1.6 | 3.2 |
| 200 | 1.4 | 0.6 | 0.4 |

The agglomerates formed by the above tests were then formulated into 20 tablets for each agglomerate under similar tabletting conditions. The following characteristics result.

TABLE 9

| Run No. | 1 | 2 | 3 |
|---|---|---|---|
| Thickness | 0.3430 | 0.3295 | 0.3680 |
| Weight (grams) | 1.9095 | 1.8804 | 1.8808 |
| Breakage (1 lbs./square inch/inch thickness) | 43.1 | 60.7 | 15.5 |

An analysis of the above data clearly illustrates the superiority of the agglomerates and tablets of this invention over conventional agglomerates using corn syrup and tablets made therefrom. For example, when dry hydrolysate is used even in lesser amounts than corn syrup solids, a stronger tablet results, as shown by the compared breakage values.

EXAMPLE 4

Following the procedure set forth in Method B, Example 1, a hydrolysate is produced having substantially the same analytical characteristics as set forth in Table 2 (e.g., D.E. = 20.7 etc.). Five percent of this dry agglomerating agent is added to a dextrose filter cake containing about 12% moisture including water of hydration. The mixture is throughly blended and added to a Hobart mixer fitted with a wisk type stirrer and steam jackets. The mixture is then agglomerated at 40° C. The resulting material, having a water content less than 10%, is an acceptable agglomerate exhibiting good anti-caking tendencies. When formulated into tablets, acceptable breaking strength results.

EXAMPLE 5

Four hydrolysates are formed, the first three according to Method A, Example 1. The analytical characteristics of these first three hydrolysates correspond substantially to those of the 5 D.E., 15 D.E. and 25 D.E. hydrolysates of Table 1. The fourth hydrolysate is produced according to Method C, Example 1, and substantially corresponds to Sample C in Table 4. Each of these hydrolysates is admixed in dry form in an amount of 2% by weight sugar solids, with a centrifuge cake of crystalline dextrose having a moisture content of about 13% including water of hydration. After thorough blending, the crystalline dextrose is agglomerated in a Hobart mixer at a temperature of 45° C. All agglomerates formed exhibit good screen profiles, hardness and anti-caking characteristics. Comparatively, the 15 D.E. hydrolysate agglomerates exhibit the best qualities, while the 5 D.E. and 25 D.E. hydrolysate agglomerates, though acceptable, were the poorest. Tablets formed of these agglomerates exhibit similar characteristics with the 5 D.E. and 25 D.E. hydrolysate tablets being the poorest in comparison with the other two types of tablets, albeit that they are acceptable.

EXAMPLE 6

Formulation of Sucrose Agglomerates

Two formulations of sucrose agglomerates were made as follows:

Formulation A: 3,175.2 grams (7 lbs.) of 1st strike substantially dry centrifugal white sucrose (water content 0.36%) were dry mixed with 4% hydrolysate (by weight sucrose); i.e., 127 grams of substantially dry hydrolysate having a D.E. of about 10. Mixing was conducted for 10 minutes in a Patterson-Kelly twin shell V dry blender whereupon water was added slowly with mixing over a 5 minute period. The amount of water added was 6% by weight total mixture (i.e., approximately 200 grams). This agglomerated mixture was then transferred to trays and hot air dried at 110° C for about 3 hours. The agglomerated product formed was screened through a Tyler No. 10 sieve (U.S. No. 12) and the through-product, considered the yield, was found to be 52% (i.e., 1,717 grams).

Formulation B: The same procedure was followed here as in Formulation A above, except that 3% water (approximately 98 grams) was used. The yield was found to be 66% (approximately 2,023 grams).

The characteristics of the two agglomerates formed are set forth in the following table.

TABLE 10

|  |  | Centrifugal Sugar Before Agglomeration | A (6% water) After Agglomeration, Drying & Screening | B (3% water) After Agglomeration, Drying & Screening |
|---|---|---|---|---|
| % Moisture |  | 0.36 | 0.25 | 0.18 |
| Screen Analysis |  |  |  |  |
| % Through Tyler Sieves | 10 | 100.0 | 93.7 | 100.0 |
|  | 14 | 99.5 | 69.6 | 79.7 |
|  | 20 | 91.7 | 39.4 | 48.4 |
|  | 28 | 45.8 | 13.9 | 24.4 |
|  | 35 | 11.5 | 2.0 | 7.4 |
|  | 42 | 5.9 | 0.4 | 4.3 |
|  | 48 | 2.9 | — | — |
|  | 60 | .7 | — | — |
| Bulk Density lbs./ft. |  | 49.4 | 40.7 | 43.8 |

On the basis of these data, both batches of agglomerated sucrose exhibited larger particle size than the centrifugal sugar used before agglomeration, Formulation A having a larger particle size than Formulation B. Comparison of the bulk densities verifies this conclusion. The agglomerates produced, in addition to exhibiting good screen profiles (i.e., substantially all of the particles are located between No. 10 and No. 42 screen sizes), were also very acceptable agglomerates for the production of tablets, or for sanding confections, such as gum drops.

EXAMPLE 7

125 grams of sucrose were dry blended with 125 grams of dextrose and 8 grams of the hydrolysate used in Example 6. The mixture was then thoroughly blended at low speed for about 5 minutes, followed by the addition of 10 mls. of water, then further mixed at slightly increased speeds for two additional minutes. The agglomerated product was hot air dried for about 1 hour. The dried product was then screened through a number 10 size screen and the percent through, considered the product yield, was 81.6%. The agglomerated product had the following characteristics:

TABLE 11

| Samples: | 50/50 Blend Before Agglomeration | 50/50 Blend After Agglomeration |
|---|---|---|
| % Moisture | 4.6 | 2.3 |
| Bulk Density Average lbs./ft. | 51.4 | 32.9 |
| D.E. (dextrose equivalent) | 49.3 | 41.3 |
| Screen Analysis, % Through Mesh Of Screen |  |  |
| 10 | 100.0 | 100.0 |

TABLE 11-continued

| Samples: | 50/50 Blend Before Agglomeration | 50/50 Blend After Agglomeration |
|---|---|---|
| 14 | 100.0 | 99.7 |
| 20 | 99.9 | 91.8 |
| 28 | 99.7 | 67.5 |
| 35 | 90.9 | 31.0 |
| 42 | 76.3 | 18.4 |
| 48 | 62.3 | 10.5 |
| 60 | 54.2 | 5.1 |
| 65 | 49.5 | 2.0 |
| 80 | 45.2 | 0.6 |
| 100 | 38.9 | 0.3 |
| 150 | 25.1 | 0.1 |
| 200 | 15.2 | 0.0 |

The agglomerate product exhibited excellent bulk density, screen profile, and flowability and was readily formed into tablets. The above data illustrate that the hydrolysate acts as a binding agent between the sucrose and dextrose, as well as an agglomerating agent for the crystals.

EXAMPLE 8

Twenty-five pounds of sucrose were dry blended with 25 pounds of dextrose using a Hobart blender with a wisk type stirrer. To this blend was then added 2 pounds of the hydrolysate agglomerating agent of Examples 6 and 7 and the mixture was blended for 10 more minutes. There was then added with mixing over a 2 minute period, 1 pound of water. This mix was then fed into a stream jacketed, hot-air rotary drier at 270° F for approximately 15 minutes. The agglomerated product was then screened with a No. 10 mesh screen, and the percent through, considered the product yield, was 75%. The product so formed had the following characteristics:

TABLE 12

| Samples | 50/50 Blend Before Agglomeration | 50/50 Blend After Agglomeration |
|---|---|---|
| % Moisture | 4.4 | 3.7 |
| Bulk Density Average lbs./ft. | 53.9 | 40.9 |
| D.E. (dextrose equivalent) | — | — |
| Screen Analysis, % Through (mesh size) |  |  |
| 10 | 100.0 | 100.0 |
| 14 | 99.8 | 99.6 |
| 20 | 99.2 | 96.2 |
| 28 | 98.0 | 89.8 |
| 35 | 89.6 | 56.6 |
| 42 | 72.2 | 35.8 |
| 48 | 55.0 | 20.0 |
| 60 | 44.2 | 10.8 |
| 65 | 36.4 | 5.6 |
| 80 | 32.0 | 2.6 |
| 100 | 28.6 | 1.2 |
| 150 | 21.4 | 0.6 |
| 200 | 18.6 | 0.4 |

The product exhibited excellent bulk density, screen profile, and flowability, as well as being readily formed into tablets. As in the proceding example, the hydrolysate acts as a binding agent, as well as a crystal agglomerating agent.

EXAMPLE 9

Typical candy tablets were formulated as follows:
About 97.00% by weight of a dextrose or sucrose product (having a low D.E. starch hydrolysate therein)

selected from one of the acceptable preceding Examples were admixed with 1.88% citric acid, 0.12% artificial orange flavoring, and 1.00% magnesium stearate. The mixture was then pressed into a candy tablet by a conventional tablet making machine. The tabletted product exhibited good strength, anti-breakage characteristics, and a flavor release characteristic of sugar tablets generally.

EXAMPLE 10

Lactose in the amount of 100 parts is agglomerated by mixing crystalline or powdered lactose with 3 parts of low D.E. starch hydrolysate having a D.E. in the range of 10–13 and 3 parts of water. The mixture is passed through a granulator and dried to yield agglomerates of a particle size substantially larger than that of the original lactose.

The agglomerated lactose is particularly useful in food formulations requiring quick dispersibility in liquid or in the formation of tablets.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

We claim:
1. A process for preparing a sugar tablet which comprises:
   a. uniformly admixing to a wet, centrifuged cake sugar of crystalline dextrose having from about 12 to about 15% by weight moisture therein, said moisture including about 9% by weight water of hydration and about 2 to about 4% by weight of a low D.E. starch hydrolysate having a D.E. in the range from about 10 to about 13 and a descriptive ratio of at least about 2, wherein the descriptive ratio is the sum of the percentages of saccharides with a degree of polymerization of 1 to 6 divided by the D.E.,
   b. drying and continuing to mix the admixture of centrifuged cake sugar of crystalline dextrose and starch by hydrolysate,
   c. recovering a substantially non-hygroscopic agglomerated cyrstalline dextrose and starch hydrolysate which passes through a screen having at least a Tyler No. 10 mesh, said recovered agglomerated crystalline dextrose exhibiting bulk density and compressability characteristics capable of forming strong tablets which are resistant to breaking and dusting, and
   d. compressing said agglomerated crystalline dextrose and starch hydrolysate into a tablet.
2. The process of claim 1, wherein said agglomerated crystalline dextrose and starch hydrolysate includes magnesium stearate and an artificial flavoring agent.
3. The process of claim 2 wherein the mixture additionally contains citric acid.

* * * * *